(No Model.) 3 Sheets—Sheet 3.
A. DUNBAR.
MACHINE FOR MAKING CASKS AND BARRELS.
No. 385,850. Patented July 10, 1888.
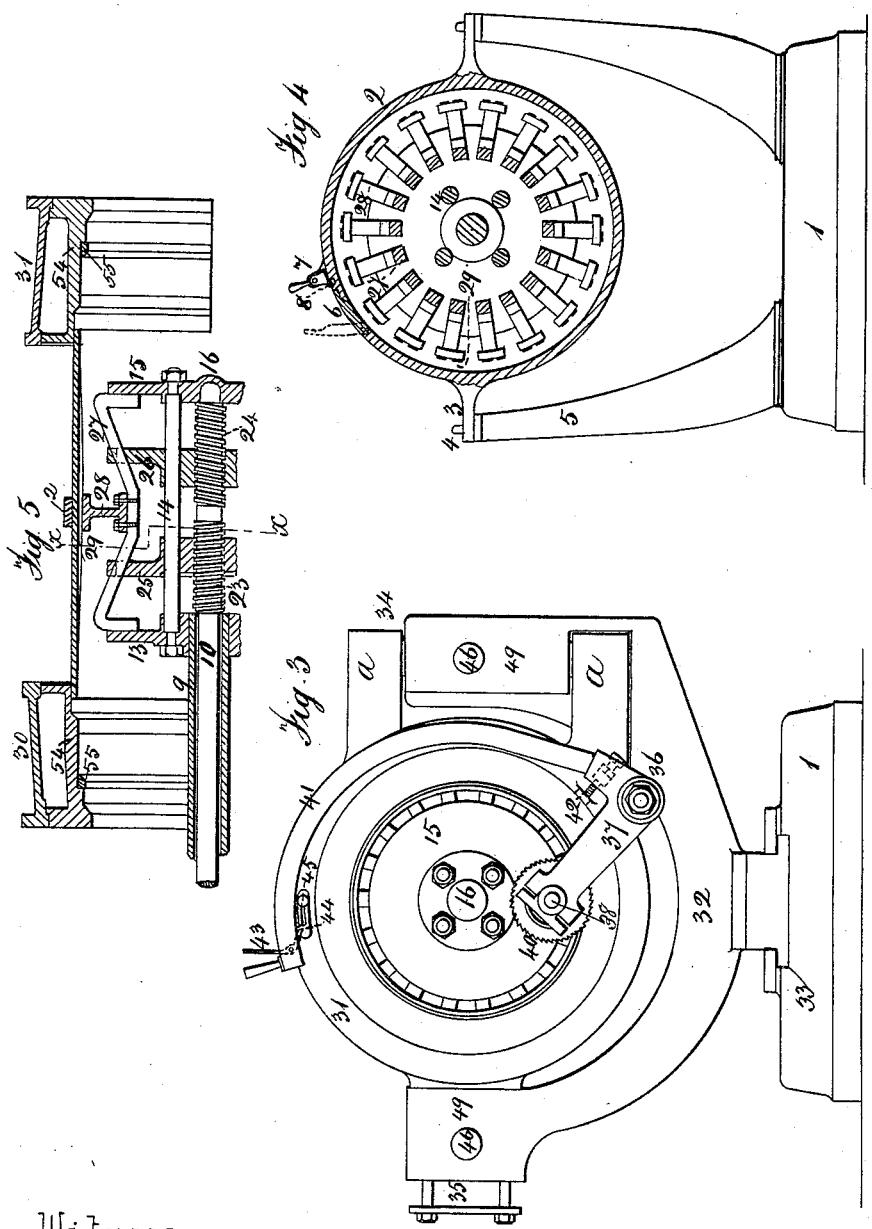
Witnesses,
James Johnson.
M. Johnson.
Inventor.
Alexander Dunbar.

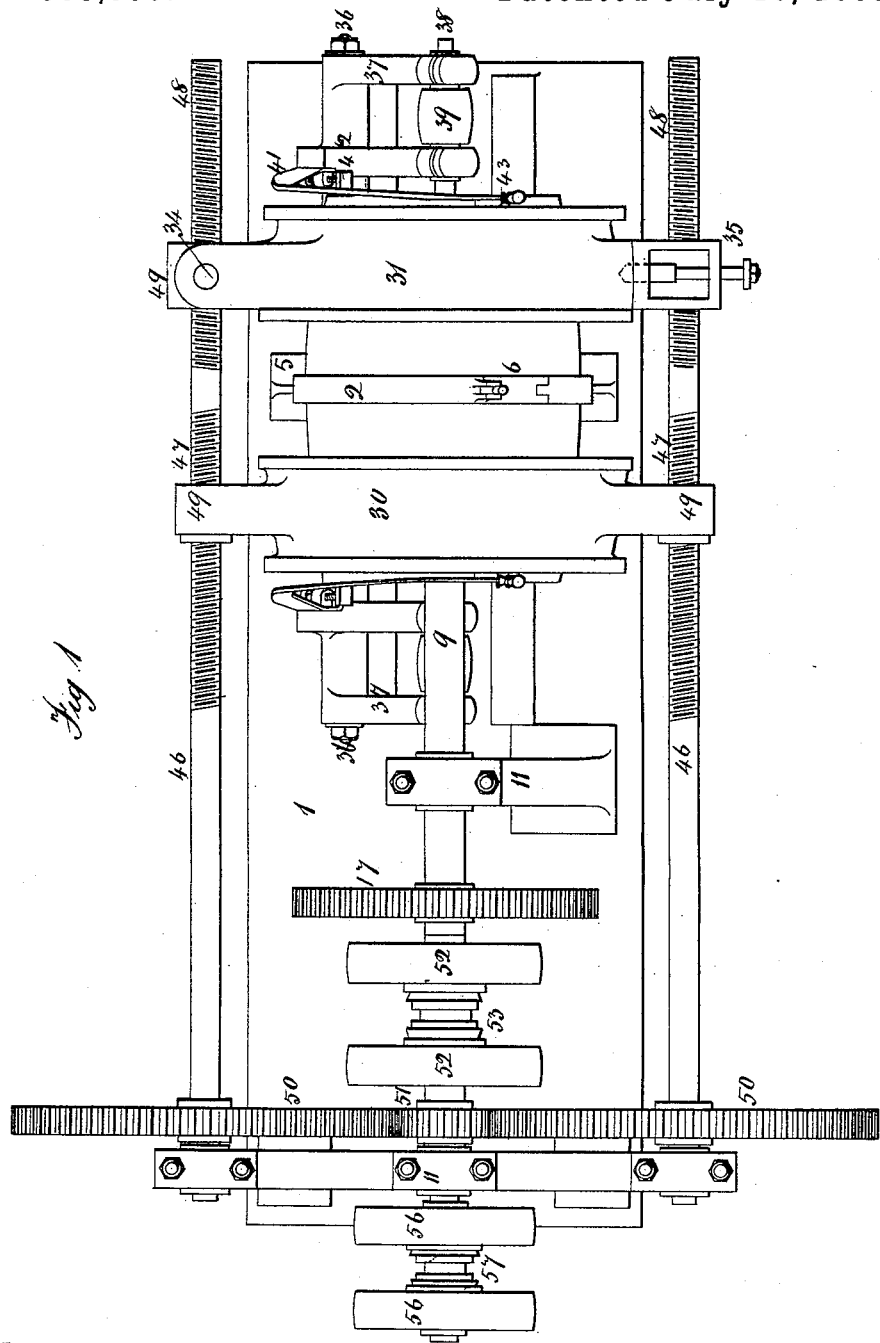

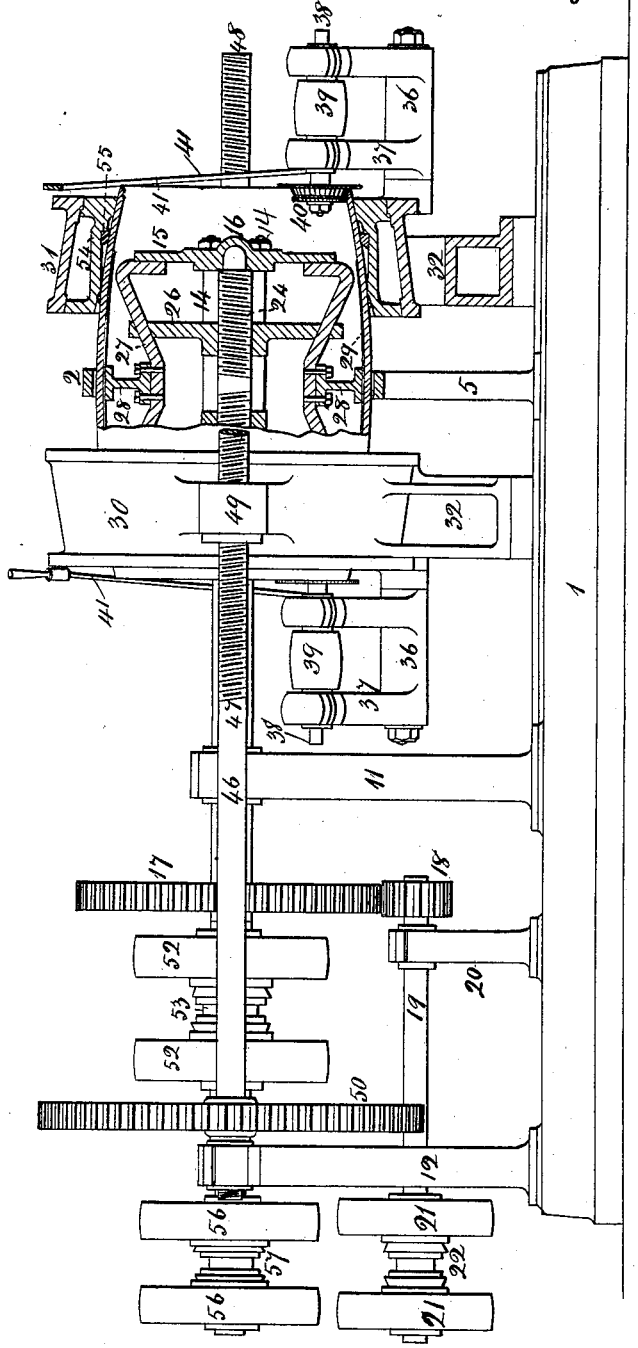

United States Patent Office.

ALEXANDER DUNBAR, OF GUELPH, ONTARIO, CANADA.

MACHINE FOR MAKING CASKS AND BARRELS.

SPECIFICATION forming part of Letters Patent No. 385,850, dated July 10, 1888.

Application filed August 7, 1886. Serial No. 210,271. (No model.) Patented in England June 9, 1884, No. 8,760, and June 30, 1885, No. 7,933; in Germany April 5, 1886, No. 32,716; in France May 21, 1886, No. 167,795, and in Spain December 20, 1886, No. 10,240.

*To all whom it may concern:*

Be it known that I, ALEXANDER DUNBAR, of the city of Guelph, Province of Ontario, Dominion of Canada, a subject of the Queen of Great Britain, at present residing at Liverpool, in the county of Lancaster, England, have invented a new and useful Improvement in Machines for Making Casks or Barrels, (for which I have obtained patents in England, No. 8,760, of June 9, 1884, and No. 7,933, June 30, 1885, and patents in France, No. 167,795, May 21, 1886; in Germany, No. 32,716, April 5, 1886; and in Spain, No. 10,240, December 20, 1886,) of which the following is a specification.

My invention relates to machines for making barrels or casks, more especially to those for making bilge casks and barrels, from staves which have been previously cut approximately to the required length and shape; and it has for its object to provide a machine which will effect the setting up, bending, and trussing of the staves and finish the end of the trussed staves, so that the body of the cask will be delivered by the machine in proper condition to receive the heads and hoops, as will be more fully hereinafter set forth.

To enable others skilled in the art to make and use my invention, I will describe the same more fully, referring to the accompanying drawings, in which—

Figure 1 is a plan view of my improved machine. Fig. 2 is a side view partly in section. Fig. 3 is an end view; Fig. 4, a section on the line *x x*, Fig. 2; and Fig. 5 is a longitudinal section of a portion of the machine.

Like letters refer to like parts in each of the figures of the drawings.

Journaled in bearings in a standard, 11, secured to a base-plate, 1, is a horizontal hollow shaft, 9, which carries on its outer end a disk, 13, to which is attached at a similar distance therefrom by stay-bolts 14 a suitable disk, 15. Within the hollow shaft 9 and projecting beyond the outer end of the same is a shaft, 10, the inner end of which bears against a seat, 16, in the center of the disk 15, and its outer end has mounted thereon the two loose pulleys 56, which are driven in opposite directions, and the sliding clutch 57 for throwing either of said pulleys into gearing with said shaft, so that the shaft 10 may be rotated either to the right or left, as may be desired. This shaft 10 has on its inner end right and left hand screw-threads 23 and 24, which are engaged each by a disk, 25 and 26, that have near their outer edges, and at uniform distances from their centers and at uniform distances apart, a series of diagonal holes through which pass bent arms 27, the outer ends of which are curved or bent inward and abut against the disks 13 and 15. These arms have attached to their middle blocks 28, which carry the spring-bearers 29 for supporting the staves, as hereinafter described. If the screw-shaft 10 is revolved to the right, disks 25 and 26 will be forced apart, and these disks in sliding over the arms 27 draw them inward, and with them the blocks 28 and bearers 29, or if the shaft is turned to the left the disks will be drawn together and the arms forced outward in virtue of the inclined or diagonal holes in the disks acting on the arms 27.

Around the spring-bearers 29, just over the blocks 28, is an independent central guide ring or collar, 2, which is supported by trunnions 3 on standards 5, attached to the base-plate 1, steadying-pins 4 being attached to the upper part of the standard to hold the trunnions in place. The inner diameter of this ring is a little larger than that of the cask or barrel to be made by the machine, and different sizes of rings may be used for barrels of different diameters. This ring is provided on one side, and a little above one of the trunnions 3, with a hinged segment, 6, for the introduction of the staves, the segment being held in position by the pin 8 and rocking clamp 7. Sliding in ways 33 on the bed-plate 1 are standards 32, each of which supports a trussing-head, 30 and 31. The trussing-head 30 is directly attached to the standard 32, while the head 31 is provided on one side with the projecting arms *a*, which swing on pivots 34 in the upright side portions of the standard 32, and on the other side with the seats, (not shown,) which are engaged by spring-bolts 35, passing through the upper end of the side portion of the standard and serving to hold the head in position until it is to be swung outward to permit the finished barrel-body to be withdrawn. On each side of the trussing-head 30 is an ear or lug, 49, Fig. 2, through which is a longitudinal threaded opening engaged by a threaded shaft, 46, provided with the right and left threads, 47 and 48, the former engaging the aforesaid opening and the latter a similar opening in the side portions of the supporting-standard 32 of the trussing-head 31. The shafts 46 have on their rear ends a pinion, 50, meshing with a pinion, 51, keyed to a sleeve on the shaft 9, which sleeve also carries the two loose pulleys 52, that are drawn by suitable belts in opposite directions, and the sliding clutch 53, which is keyed to the sleeve and serves to transmit the motion imparted to either of the pulleys to the sleeve and pinion 51, and thus rotates the shaft 46 to the right or left to separate or draw toward one another the trussing-heads 30 and 31. Within each trussing-head are liners 54, which are removably attached to the heads, so that different sizes may be inserted for different sizes of barrels to be made, and within recesses in these liners are the trussing-hoops 55. Projecting from the outer face of each trussing-head is a pivot or fixed spindle, 36, on which is mounted the swinging bracket 37, which is provided with bearings in its upper end, in which is journaled the spindle 38, that carries a pulley, 39, and has on its inner end suitable dressing-tools, 40, for trimming off the ends of the barrels to receive the heads. In order to properly adjust the position of these dressing-tools and secure them in position while operating, a curved arm, 41, is attached to the bracket 37, and has a set-screw, 42, which bears against the trussing-head for limiting the amount of downward movement of the arm, and on the upper end of the arm has a spring-catch, 43, which engages a notch in a slotted catch-plate, 44, held adjustably in position by the clamping-screw 45 on the face of the truss-head. When the set-screw 42 has been adjusted so as to bring the tool 40 in the proper position, the clamping-screw 45 is loosened and the catch-plate 44 moved along until it is engaged by the spring-catch 43, when the clamping-screw is again tightened to hold the catch-plate in its new position. This catch prevents the arm 37 and tool 40 from flying up from its work, while the screw 42 limits the amount of cut of the tool by limiting the downward movement of the arm 37. The hollow shaft 9 extends backward from the bearing 11, and has keyed thereto a pinion, 17, which meshes with a pinion, 18, Fig. 2, on the counter-shaft 19, journaled in bearings in the standards 20 and carrying on its outer end the two loose pulleys 21 and the sliding clutch 22, the object being to drive these pulleys by suitable belts in opposite direction, so that the shaft 9, and with it the disks 13 and 15, are rotated either to the right or left, as may be desired, and thus turn the spring-bearers around under the guide-ring 2.

The operation of the machine is as follows: The trussing-heads 30 and 31 are fully separated, and the liners 54 and trussing-hoops 55, of the required size to make the barrels desired, inserted therein, and a guide-ring, 2, of the right size hung on the standards 5. The spring-bearers 29 are then adjusted to such a distance from the center of the shaft 10, by rotating the latter, that just enough space is left between the ring 2 and the bearers to receive the staves. The door or hinged segment 6 in the ring 2 is then opened and the staves are fed into the space between the ring and the spring-bearers, the shaft 9, and with it the disks 13 and 15, being rotated to bring each of the spring-bearers 29 opposite the opening in the ring, so that the required number of staves may be inserted to make a complete barrel. When all the staves have been inserted, the door of the ring 2 is closed and locked, and one of the pulleys 56 is thrown into gear with the shaft 10 to rotate the latter and cause the disks 25 and 26 to move inward toward each other, (the shaft 9 being held stationary,) which compels the arms 27 to move outward until the spring-bearers 29, carried on the block 28, are pressed against the staves with sufficient force to hold the staves tightly against the ring 2, when the pulley 56 is thrown out of gear with the shaft 10 and its rotation stopped. The shafts 46 are now rotated by throwing one of the pulleys 52 into gearing with the sleeve on the shaft 9, so that the trussing-heads 30 and 31, with their liners 54 and trussing-hoop 55, will be drawn together until the staves are compressed into the shape shown in Fig. 2. Just before the completion of this trussing operation motion is given to the shaft 10, so as to retract the spring-bearers 29 and allow the staves to be closely drawn together at the center by the pressure of the trussing-heads. As soon as the trussing is completed, the shafts 46 are rotated, so as to move the trussing-heads 30 and 31 a slight distance apart, so as to be out of contact with the staves and bring the cutting-tools 40 into the required position. The staves which make up the barrel-form are now tightly held between the spring-bearers 29 and the trussing-hoops 55. This barrel-form is caused to revolve by throwing one of the pulleys 21 into gear with the counter-shaft 19, and at the same time the cutting and dressing tools 40 are revolved by a suitable belt passing over the pulley 39 on the spindle 38, and the tool brought into proper position by moving the arm 41 until the spring-catch 43 engages the notched plate 44 on the truss-head, the plate having been previously adjusted to bring the tool in proper position. This effects the complete dressing off of the end of the staves, so that the barrel body or form is ready for the heads to be placed thereon.

Instead of rotating the tool 40, fixed tools may be used and the barrels rotated more rapidly. As soon as the tools have finished their work, the spring-bearers are withdrawn toward the center of the shaft 10 and the trussing-head 31 swung on its pivots and the barrel body or form removed.

Having now described my invention, what I claim is—

1. In a barrel-making machine, the combination of two sliding trussing-heads with a removable guide-ring supported between said heads, substantially as and for the purpose set forth.

2. In a barrel-making machine, the combination of sliding trussing-heads with a removable guide-ring supported between said heads, a segment of said ring being hinged so as to open, substantially as described.

3. In a barrel-making machine, the combination of two trussing-heads sliding in guides, one of said heads being pivotally mounted on its supporting-standard so that it may be swung open to permit the barrel to be withdrawn, with means for advancing or retracting said heads toward and from one another, substantially as described.

4. In a barrel-making machine, a trussing-head having a bracket pivoted to its outer face and a tool-spindle mounted in said bracket, substantially as and for the purpose set forth.

5. In a barrel-machine, the combination of a trussing-head having a bracket pivoted to its outer face and a tool-spindle mounted in said bracket, with means for adjusting and holding said bracket in position on its pivot, substantially as and for the purpose set forth.

6. In a barrel-making machine, the combination of a guide-ring, a series of spring-bearers supported within said ring for holding the staves in position, and means for moving said bearers in or out, substantially as described.

7. In a barrel-making machine, the combination of a central threaded shaft, 10, disks 25 and 26, engaged by said shaft, curved arms 27, passing through holes in said disks, and stave-bearers carried by said arms, substantially as and for the purpose set forth.

8. In a barrel-making machine, the combination of two trussing-heads sliding in suitable guides on the frame of the machine, a guiding-ring supported between said heads, and a revolving collapsible core within said ring, substantially as and for the purpose set forth.

ALEXANDER DUNBAR.

Witnesses:
JAMES JOHNSON,
W. B. JOHNSON.